United States Patent
Loukas et al.

(10) Patent No.: US 12,333,236 B2
(45) Date of Patent: Jun. 17, 2025

(54) SYSTEM AND METHOD FOR AUTOMATICALLY TAGGING DOCUMENTS

(71) Applicant: National Centre for Scientific Research "Demokritos", Agia Paraskevi (GR)

(72) Inventors: Eleftherios Panagiotis Loukas, Agia Paraskevi (GR); Eirini Spyropoulou, Agia Paraskevi (GR); Prodromos Malakasiotis, Agia Paraskevi (GR); Emmanouil Fergadiotis, Agia Paraskevi (GR); Ilias Chalkidis, Agia Paraskevi (GR); Ioannis Androutsopoulos, Agia Paraskevi (GR); Georgios Paliouras, Agia Paraskevi (GR)

(73) Assignee: National Centre for Scientific Research "Demokritos", Agia Paraskevi (GR)

( * ) Notice: Subject to any disclaimer, the term of this patent is extended or adjusted under 35 U.S.C. 154(b) by 288 days.

(21) Appl. No.: 17/873,932

(22) Filed: Jul. 26, 2022

(65) Prior Publication Data
US 2023/0028664 A1      Jan. 26, 2023

(30) Foreign Application Priority Data
Jul. 26, 2021   (EP) .................................... 21386048

(51) Int. Cl.
*G06F 40/117* (2020.01)
*G06F 40/143* (2020.01)
(Continued)

(52) U.S. Cl.
CPC .......... *G06F 40/117* (2020.01); *G06F 40/143* (2020.01); *G06F 40/151* (2020.01); *G06F 40/166* (2020.01); *G06F 40/284* (2020.01)

(58) Field of Classification Search
None
See application file for complete search history.

(56) References Cited

U.S. PATENT DOCUMENTS 10,817,619 B1 *  10/2020  Kolli .................... G06F 21/552
10,997,369 B1 *  5/2021   Frazier ................. G06F 40/284
(Continued)

FOREIGN PATENT DOCUMENTS

| CN | 112257442 | 1/2021 |
| EP | 4124988 | 2/2023 |
| WO | WO 2023/006773 | 2/2023 |

OTHER PUBLICATIONS

Chalkidis Ilias et al.: "An Empirical Study on Large-Scale Multi-Label Text Classification Including Few and Zero-Shot Labels" Proceedings of the 2020 Conference on Empirical Methods in Natural Language Processing, Nov. 20, 2020 (Nov. 20, 2020), pp. 7503-7515, XP055981964.
(Continued)

*Primary Examiner* — Ariel Mercado-Vargas
(74) *Attorney, Agent, or Firm* — Polsinelli LLP

(57) ABSTRACT

System and methods (100) for automatically tagging electronic documents are disclosed. An input module receives (102) an electronic document to be tagged. A preprocessing module then preprocesses (104) the electronic document to be tagged. The preprocessing of the electronic document comprises extracting a text from the electronic document to be tagged, replacing a number or a date in the extracted text with a predetermined symbol, and tokenizing the extracted text with the predetermined symbol into a plurality of tokens. After the preprocessing (104), a deep learning module determines (106) a tag for at least one of the plurality of tokens. The determined tag for the at least one token is then output (108) by an output module.

18 Claims, 7 Drawing Sheets

(51) Int. Cl.
  *G06F 40/151* (2020.01)
  *G06F 40/166* (2020.01)
  *G06F 40/284* (2020.01)

(56) References Cited

U.S. PATENT DOCUMENTS

| | | | | |
|---|---|---|---|---|
| 12,026,280 | B2* | 7/2024 | Dash | G06F 21/604 |
| 2008/0118150 | A1* | 5/2008 | Balakrishnan | G06F 21/6254 |
| | | | | 382/176 |
| 2017/0098093 | A1* | 4/2017 | Koo | G06F 21/6209 |
| 2021/0192126 | A1* | 6/2021 | Gehrmann | G06N 20/00 |
| 2021/0217408 | A1* | 7/2021 | Hakkani-Tur | G06N 3/02 |
| 2021/0390080 | A1* | 12/2021 | Tripathi | G06F 21/62 |
| 2022/0035990 | A1* | 2/2022 | Kaza | G06N 20/00 |
| 2023/0022845 | A1* | 1/2023 | Meng | G06N 3/08 |

OTHER PUBLICATIONS

PCT Application No. PCT/EP2022/070985 International Search Report and Written Opinion dated Nov. 29, 2022.
Baviskar et al., "Efficient Automated Processin of the Unstructured Documents Using Artificial Intelligence: A Systematic Literature Review and Future Directions" Digital Object Identifier, IEEE Access, vol. 9, pp. 72894-72936, 2021.
PCT Application No. PCT/EP2022/070985, International Preliminary Report on Patentability dated Feb. 8, 2024.
European Application No. EP21386048.9, Extended European Search Report dated Jan. 7, 2022.
European Application No. EP21386048.9, First Examination Report dated Aug. 2, 2024.

* cited by examiner

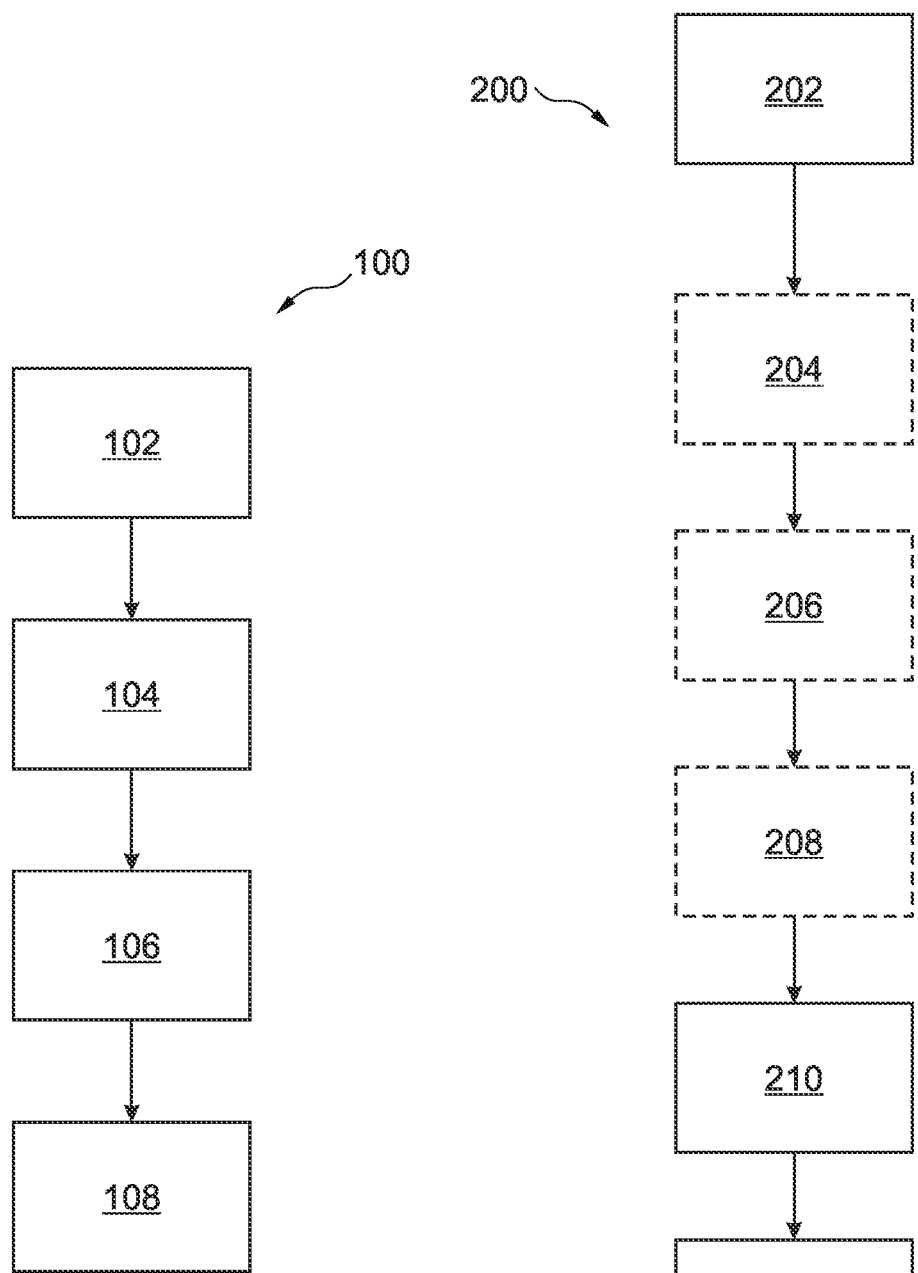

SYSTEM AND METHOD FOR AUTOMATICALLY TAGGING DOCUMENTS

CROSS-REFERENCE TO RELATED APPLICATIONS

The present application claims the priority benefit of European patent application EP21386048.9 filed Jul. 26, 2021, the disclosure of which is incorporated herein by reference.

TECHNICAL FIELD

The present application relates generally to systems and methods for tagging documents. More particularly, it relates to systems and methods for automatically tagging electronic documents based on deep learning techniques.

BACKGROUND OF THE RELATED ART

Natural language processing (NLP) for finance is an emerging research area. Financial data is mostly reported in tables, but substantial information can also be found in textual form, e.g., in company filings, analyst reports, and economic news. Such information is useful in numerous financial intelligent tasks, like stock market prediction, financial sentiment analysis, economic event detection, and causality analysis.

Extensive Business Reporting Language (XBRL) is a specification for digital business reporting which was introduced with the vision to make the preparation, validation, publication, exchange, consumption and analysis of financial reports easier and more accurate. XBRL is mainly implemented and used as an XML markup language and it is used to tag reported financial values and text within a report according to standard taxonomies. Every country or jurisdiction has its own XBRL taxonomy, which encodes the different accounting standards and regulatory obligations.

The structures of tables in reports of a particular company rarely change. Hence, tagging the contents of tables with XBRL when preparing a new report can be easily achieved by using company-specific pre-tagged table templates. However, the unstructured and dynamic nature of text notes makes adding XBRL tags to them much more difficult. A human auditor needs to spend considerable time to go through the report, and check every tag for correctness and assess whether tagging is complete as well.

To avoid the tedious and costly manual tagging process, methods for automatically tagging reports or other financial documents are helpful. Different methods for annotating documents with XBRL tags have already been proposed. For example, U.S. Pat. No. 8,849,843 relates to the analysis of structured and unstructured documents to determine associations between structured content and unstructured content to facilitate semantic tags to be applied to content. U.S. Pat. No. 8,990,202 teaches methods and systems for assisting with the conversion of text documents into documents annotated using XBRL.

For documents containing financial information, many of the tokens that need to be tagged are however numeric, with the right tag depending mostly on context, not the tokens themselves. For example, over 90% of the XBRL tagged tokens in text notes of reports are numeric. Techniques known from the art deliver poor and unsatisfactory results for tagging numerical or date values.

There is therefore a need in the art to more accurately tag documents including numbers or dates.

SUMMARY OF THE INVENTION

The invention is defined in the appended independent claims. Particular embodiments are set out in the dependent claims.

In particular, the present invention provides a computer-implemented method for automatically tagging the content of electronic documents. An input module receives an electronic document to be tagged. A preprocessing module then preprocesses the electronic document to be tagged. The preprocessing of the electronic document comprises extracting a text from the electronic document to be tagged, replacing a number or a date in the extracted text with a predetermined symbol, and tokenizing the extracted text with the predetermined symbol into a plurality of tokens. After the preprocessing, a deep learning module determines a tag for at least one of the plurality of tokens. The deep learning module may be pre-trained and/or trained as described below. The determined tag for the at least one token is then output by an output module.

As used herein, the term "tag" may be a keyword, a term, a label, a reference or the like assigned to a piece of information included in a document. For example, tags may be assigned to a certain part or (text) element in an electronic document. The process of tagging an electronic document may add or associate an annotation, a comment, a class, or other additional information to the piece of information. Tagging a piece of information in a document thus allows adding additional information to an original document, assigning certain parts of the document to a particular class, and/or highlighting or marking certain already existing information in an electronic document.

The task of tagging an electronic document may be understood as a classification problem. The different pieces of information in the electronic document (or at least some thereof) are assigned to one or more classes, wherein each class may be associated with a tag. In some examples, tags may be assigned to all pieces of information (i.e., tokens).

The method may be used to tag a single electronic document. For example, a user selects or provides a particular document which is to be tagged. The method then may tag the selected or provided document and may return a tagged document. Alternatively, a plurality of electronic documents may be tagged by the method either in parallel and/or in sequence. The method may be executed separately or may be one processing step of a processing pipeline consisting of many different processing steps.

The electronic document to be tagged may be a document in electronic form, e.g., a computer file. The electronic document may have different formats. For example, the electronic document may be in the Portable Document Format (PDF), in Hyper Text Markup Language (HTML) format, in Extensible Markup Language (XML) format, or in Postscript (PS) format. Alternatively, the electronic document may also be in a format usually used by text processing programs. For example, the electronic document may be a Microsoft Word file or a file in the Rich Text Format. In other examples, the electronic document also may be a file, a data stream, or data input containing formatted or unformatted text (e.g., a file in TXT format). The electronic document does not necessarily have to be in a character-coded format, but originally may also be in an image format (e.g., an image file of a scanned document) as long as text of interest is extractable from the electronic document (e.g., by using optical character recognition).

The determined tags may be directly added to the electronic document (e.g., as comments, as annotations, by using a particular font or color, etc.) or may be output separately (e.g., as a separate file, as output on a display, etc.).

The input module may receive or obtain the electronic document from another system or module or as user input. Alternatively or additionally, the input module may load or download the electronic document. The electronic document may include numbers and/or dates.

During the preprocessing of the electronic document to be tagged, a text or a text section is extracted from the electronic document to be tagged. Depending on the type or format of the electronic document, different steps are necessary to extract the text. For example, in character-based file formats certain text passages or text portions of particular interest may be extracted by regular expressions. For image files, optical character recognition (OCR) may be necessary. The text of the electronic document which is to be extracted may be selected by a user. For example, the user manually selects text portions of interest. Alternatively or additionally, an automatic text selection may be performed based on various (user-defined or machine-learned) criteria. In other examples, all text included in the electronic document is extracted.

After the text is extracted from the electronic document, numbers and/or dates are identified in the extracted text and replaced by the predetermined symbol. A number may be a numerical expression or phrase involving one or more numbers and sometimes other symbols. A date may be a date expression or phrase involving a date and sometimes other symbols. The numbers and/or the dates in the extracted text may have different values and may be formatted differently. For example, the numbers and/or dates as included in the extracted text may include separators (e.g., a thousand separator, commas, etc.) for formatting the numbers/dates for better readability, use decimal places, or include other symbols (e.g., symbols identifying a currency) in addition to numbers.

The predetermined symbol (e.g., a single pseudo-token) may be a single character or may be a combination of two or more characters (i.e., a string consisting of one, two or more characters). In order to avoid unexpected results, it is advantageous to use a special character or a special character combination as predetermined symbol which is not used in the extracted text in its original form. For example, numbers may be replaced with the term "[NUM]", while the term "[DATE]" is used for dates.

The extracted text and/or the electronic document to be tagged may include one or more numbers and/or one or more dates. In such a case, only one, a subset of, or all of the numbers included in the extracted text may be replaced by the predetermined symbol. Similarly, only one, a subset of, or all of the dates included in the extracted text may be replaced by the predetermined symbol(s).

The numbers and/or dates in the extracted text may be identified or detected by means of one or more regular expressions. For example, for Unix or Unix-like operating systems the command line tool 'sed' allows finding strings defined by a regular expression and then replacing the found strings with another string (i.e., the predetermined symbol).

After numbers and/or dates have been replaced in the extracted text, the text with the predetermined symbol(s) is then tokenized. Tokenization is the process by which a larger quantity of text is divided into smaller parts called tokens. The result of the tokenization is a plurality of tokens or a sequence of tokens (i.e., the plurality of tokens are arranged in a particular order). For example, a tokenization process divides a sentence in the extracted text into a sequence including words, predetermined symbols, punctuation characters, and other characters.

The plurality of tokens or the sequence of tokens is then input to the deep learning module to determine a tag for at least one of the plurality of tokens. The deep learning module is pre-trained. The input to the deep learning module may comprise the plurality of tokens along with position information for the plurality of tokens. The deep learning module may recommend the most probable tag for at least one of the plurality of tokens from a given taxonomy. The given taxonomy may also include one or more tags for tokens for which no tag was determined (i.e., no-tags). Alternatively, the deep learning module may recommend a list of two or more probable tags for at least one of the plurality of tokens. For example, all tags having a probability above a certain threshold are included in the list or the tags with the n highest probability values are used, wherein n is an integer greater than or equal to 2 and the value of n is predefined and/or configurable.

The deep learning module may recommend tags for at least one, for two or more, for three or more, for some (e.g., less than 30%), for the majority (e.g., more than 60%), or for all of the plurality of tokens. Tokens for which no tag of interest can be determined may either be output without tags or with special tags indicating that these tokens are less relevant for the tagging task or that no tag could be determined.

The present invention also provides a computer-implemented method for training a deep learning module (e.g., a neural network in the deep learning module). For example, the deep learning module used for automatically tagging an electronic document may be trained. The training method is however not limited to deep learning modules used for tagging, but may also be used for other tasks in which numbers and/or dates play an important role.

The method for training a deep learning module comprises receiving a plurality of electronic documents as training dataset. The plurality of electronic documents is labelled. That means, the plurality of electronic documents comprises tags associated with one or more text elements in the plurality of electronic documents. Each of the plurality of electronic documents is preprocessed. The preprocessing comprises extracting a text from each of the plurality of electronic documents, replacing a number or a date in the extracted text with a predetermined symbol, and tokenizing the extracted text with the predetermined symbol into a plurality of tokens. At least some of the plurality of tokens are associated with the tags. The deep learning module is then trained with the plurality of tokens along with the tags.

A plurality of electronic documents used as training dataset is received, obtained, input or loaded as training corpus for training the deep learning module. The plurality of electronic documents used as training dataset may include documents in one or more electronic formats, e.g., computer files, data streams, or data input. For example, the plurality of electronic documents used as training dataset may be PDF files, HTML files, XML files or PS files. Alternatively, the plurality of electronic documents used as training dataset may also be in a format usually used by text processing programs. For example, the plurality of electronic documents used as training dataset may be Microsoft Word files or files in the Rich Text Format. In other examples, the plurality of electronic documents comprises files containing formatted or unformatted text (e.g., a TXT file or a HTML file). The plurality of electronic documents used as training dataset does not necessarily have to be in a character-coded format but may also be in an image format as long as text and the tags are extractable (e.g., by using optical character recognition). The plurality of electronic documents used as training dataset may include electronic documents in the same format or in different formats.

At least some of the electronic documents of the plurality of electronic documents used as training dataset include elements or components which are associated with one or more tags (or labels). Each element may relate to an information piece in the electronic document. For example, one or more tags may be associated with information pieces such as words, groups of words, expressions, or phrases in the electronic document. The tags may be manually added to the elements by one or more users or may be automatically added to the electronic documents (e.g., when the electronic documents were created) and then reviewed by one or more users. The tags may provide additional information (e.g., classification information) for the elements.

Before being used to train the deep learning module, each of the plurality of electronic documents used as training dataset is preprocessed. Alternatively, only a subset of the plurality of electronic documents is used for the training and therefore further processed (e.g., only documents meeting a certain quality or filter criterion). The plurality of electronic documents may be preprocessed in parallel or in sequence.

The preprocessing step for the plurality of electronic documents used as training dataset is similar to the above-described preprocessing step used for the electronic document to be tagged.

A text or a text section is extracted from each of the plurality of electronic documents. The extracted text may comprise one or more elements of the plurality of electronic documents. Depending on the type or format of a document, different steps are necessary to extract the text. For example, in character-based file formats certain text passages or text portions of particular interest are extracted by regular expressions. For image files, optical character recognition (OCR) may be necessary. The text which is to be extracted may be manually selected by a user—either on a per-document basis, for a group of documents, or for all documents. For example, the user selects text portions of interest (e.g., certain sections or paragraphs of a document). Alternatively or additionally, an automatic text selection may be performed based on various (user-defined or machine-learned) criteria. In other examples, all text included in the plurality of electronic documents is extracted.

After the text is extracted from the plurality of electronic documents, numbers and/or dates are identified in the extracted text and replaced by the predetermined symbol. A number may be a numerical expression or phrase involving one or more numbers and sometimes other symbols. A date may be a date expression or phrase involving a date and sometimes other symbols. The numbers and/or the dates in the extracted text may have different values and may be formatted differently. For example, the numbers and/or dates as included in the extracted text may include separators (e.g., a thousand separator, commas, etc.) for formatting the numbers/dates for better readability, use decimal places, or include other symbols in addition to numbers.

The predetermined symbol (e.g., a single pseudo-token) may be a single character or may be a combination of two or more characters (i.e., a string consisting of one, two or more characters). In order to avoid unexpected results, it is advantageous to use a special character or a special character combination as predetermined symbol which is not used in the extracted text in its original form. For example, numbers are replaced with the term "[NUM]", while the term "[DATE]" is used for dates.

The extracted text and/or the plurality of electronic documents may include one or more numbers and/or one or more dates. In such a case, only one, a subset of, or all of the numbers included in the extracted text may be replaced by the predetermined symbol. Similarly, only one, a subset of, or all of the dates included in the extracted text may be replaced by the predetermined symbol.

The numbers and/or dates in the extracted text may be identified or detected by means of one or more regular expressions. After numbers and/or dates have been replaced in the extracted text, the text with the predetermined symbol(s) is then tokenized. Depending on the plurality of electronic documents, the plurality of tokens is associated with one or more tags. For example, one token of the plurality of tokens is associated with one or more tags. As discussed above, an element of a received electronic document may be associated with a certain tag. The element may then be transferred to a certain token. The token may be associated with the tag originally associated with the element.

The tokens of the extracted text together with the tags associated with the tokens are then used to train the deep learning module.

The described methods have numerous advantages over previous approaches.

Replacing numbers and/or dates in the text to be tokenized by a predetermined symbol has the advantage that sub-word fragmentation can be reduced. Experiments have shown that sub-word fragmentation can harm the performance of the deep learning module, because it increases the probability of producing nonsensical sequences of labels. For example, the numerical expression '9,323.0' may be split into five sub-word units (e.g., '9', '##,', '##323', and '##0'), while the numerical expression '12.78' may be split into three sub-word units (e.g., '12', '##', and '##78'). Fragmented numeric expressions make it difficult for a model to gather information from the fragments and correctly tag them all. The described methods avoid "overfragmentation" and therefore have the advantage that the performance of the deep learning module is improved since a number is processed as a single token. The tags recommended by the described methods are thus of high accuracy, especially for documents with many numbers and dates. Moreover, the use of the predetermined symbol allows handling all numbers (or numerical expressions in general) or dates in a uniform manner, disallowing their fragmentation.

In the financial domain, many pieces of information are numeric. For example, over 90% of the XBRL tagged tokens in text notes of reports are numeric. As the described methods improve the classification and tagging performance for documents with numbers and dates they are particularly well suited for the financial domain.

It has further been found that for numbers and dates, the question which tag is most appropriate depends mostly on the context and the token shape, rather than on the exact value. In many cases, the exact value is less relevant for the classification or tagging task. Unlike other solutions the described methods allow using the tokens (e.g., the words) surrounding the number or date to perform training and prediction, not the number or date itself. The described methods also reduce the complexity, while improving the performance. More specifically, numeric or date expressions often get excessively fragmented by usual prior art techniques. This makes it difficult to use information from the fragments and complicates the task to correctly tag them all.

The method also uses deep representations of the surrounding words to predict the right tag for a given numeric or date value. This helps associating words not based on the literal sequence of characters they contain, but on the context in which they have been found in the historical data. For example, taking the literal sequence of characters the token "cat" is something different from "kitten" as they do not share the same characters. The described method can however handle that since it maps tokens to a latent space, threating them as numerical vectors and not pure characters. This boosts the method's classification performance.

Furthermore, the method can automatically identify which tokens need to be tagged or not. Other prior art systems expect a user input the specific token to be tagged.

The tag recommendation is also modelled as a sequence labelling problem. The sequential context of the used model has a better predictive performance than prior art techniques as most prior art techniques consider context on the form of bag-of-words (i.e., a multiset). In such cases the text "a Jeep is a car type" will be treated in the same way as the sentence "a car is a Jeep type" which could lead to faulty predictions. By taking the order of the plurality of tokens into account, the results of the described method are further improved.

In some embodiments, preprocessing the electronic document to be tagged or preprocessing the plurality of electronic documents further comprises normalizing the text extracted from the electronic document to be tagged or the text extracted from each of the plurality of electronic documents into a normalized text; and/or splitting the text extracted from the electronic document to be tagged, the text extracted from each of the plurality of electronic documents, or the normalized text into a plurality of sequences.

The preprocessing of the documents may thus comprise one or more additional steps to further improve the results. For example, the extracted text may be normalized. When normalizing a natural language resource, the randomness in it is reduced so that the normalization brings the extracted text closer to a predefined "standard". In other words, the text originally extracted from the electronic document(s) or an already processed text is transferred into a form in which unnecessary information is removed or at least reduced. This helps reducing the amount of different information that the method has to deal with, and therefore improves efficiency. The normalized text may, for example, be HTML-stripped or lower-cased.

Additionally or alternatively, the preprocessing of the electronic document(s) may also split the text extracted from the electronic document(s) into a plurality of sequences. For example, the Natural Language Toolkit, more commonly known as NLTK, may be used to split the text. The extracted text may be split into one or more text portions, for example, one or more sentences, one or more paragraphs, or one or more pages.

Further, sentences or other text portions which do not contain information of interest may be discarded or ignored. For example, heuristic rules may be employed to discard sentences that almost certainly do not need to be tagged.

Another preprocessing step may detect and remove tables from the electronic document(s) if they do not need to be tagged. The structures of tables in electronic documents are often similar. For example, tables in financial reports of a particular company rarely change. Hence, tagging the contents of tables can be easily achieved by using company-specific pre-tagged table templates.

In some embodiments, tokenizing the extracted text into the plurality of tokens processes or handles the predetermined symbol as an undividable or unsplittable expression and/or transfers the predetermined symbol into a single token.

As outlined above, sub-word fragmentation of numbers and/or dates harms the performance of many deep learning models. To improve the performance, the method replaces numbers and dates with a predetermined symbol. The predetermined symbol is processed as undividable or inextricable and is thus not split, by a tokenizer, into two or more tokens during the tokenization process. For example, the predetermined symbol is chosen so that the used tokenization algorithm interprets it as a single token. In alternative implementations, the number of tokens may at least be reduced by using the predetermined symbol. Additionally or alternatively, the used tokenization algorithm may be adapted so that for the predetermined symbol a single or at least a reduced number of tokens is produced.

That means the predetermined symbol or the predetermined symbols in the extracted text are transferred into a single token (or at least a reduced number of tokens when compared to original representation of the number or the date).

In some embodiments, the extracted text comprises more than one number and/or date to be replaced, and the same predetermined symbol is used for all numbers and/or all dates in the extracted text independent of the value, the shape, or the magnitude of the numbers or of the dates.

The method may detect numbers in the extracted text (e.g., by using a regular expression) which are to be replaced and may replace each one of the detected numbers by the same predetermined symbol. For example, all numbers are replaced by the expression "[NUM]". The value, the shape, the format, or the magnitude of the number does not matter.

Similarly, a single predetermined symbol is used for all dates that are identified in the extracted text and that are to be replaced. The predetermined symbol for the dates may be different from the predetermined symbol used for the numbers. For example, dates in the extracted text are replaced by the expression "[DATE]". The value, the shape, or the format of the date does not matter.

Alternatively, the same predetermined symbol may be used for numbers and for dates. For example, the expression "[NUM]" is used for both numbers and dates so that only a single predetermined symbol is used even if the extracted text includes both numbers and dates. Each occurrence of a number or a data may then be replaced by the same single predetermined symbol.

Replacing the number and/or the date in the extracted text before tokenizing the text reduces the "overfagmentation" and significantly boosts the performance of the deep learning model.

In some other embodiments, the predetermined symbol represents a particular shape, a particular format and/or a particular magnitude of the number and/or of the date to be replaced.

In this case, instead of a single predetermined symbol for all numbers and/or dates, a set of predetermined symbols may be used and one symbol from this set of predetermined symbols is selected for a number or a date found in the extracted text. The symbols in the set of predetermined symbols are different. The different symbols reflect or represent different shapes, different formats and/or different magnitudes of a number or of a date, but not the exact value of a number or a date. The selection may be based on the shape, format and/or magnitude of the number and/or date to be replaced.

For instance, the number '53.2' found in the extracted text becomes 'XX.X', and '40,200.5' becomes 'XX,XXX.X'. In some exemplary embodiments, more than 100 different symbols, preferably more than 200 different symbols, may be used for numbers. These symbols then cover the number shapes, and indirectly also provide information about each number's magnitude. The intuition is that numbers of similar magnitudes may require similar tags.

In some embodiments, the determined tag is one tag from a set of different tags or the tags associated with text elements in the plurality of electronic documents used as training corpus belong to a set of different tags. The set of different tags may be predetermined and may comprise more than 50 different tags, preferably more than 100 different tags, and more preferably more than 1000 different tags.

In contrast to many prior art techniques, the method also performs well on large sets of possible tags. One of the tags in the set is assigned to each, to the majority (i.e., more than 70%), to at least some (i.e., not more than 30%), to two or more of the tokens, or to only a single token.

The number of different tags in the set of tags may be task specific and differs depending on the classification or tagging task. For example, the set of tags may comprise more than 50 different tags. In another example, more than 100 different tags are included in the set of tags (e.g. 139 different tags). In still another example, the set of tags includes at least 1000 different tags.

In some embodiments, the deep learning module comprises an artificial neural network.

A neural network comprises units (neurons), arranged in layers, which convert an input vector into some output. Each unit takes an input, applies a function to it and then passes the output on to the next layer. Weightings and non-linear functions are applied to the signals passing from one unit to another, and it is these weightings which are tuned in the training phase to adapt a neural network to the particular problem at hand.

Neural networks may be used for classification tasks. That is, one or more tags representing a class are assigned to a token or an input sample is assigned to one or more classes.

The neural network of the deep learning module may be trained by the training method described above.

In some embodiments, the deep learning module comprises a transformer-based deep learning model. Preferably, the transformer-based deep learning model is based on or is a Bidirectional Encoder Representations from Transformers (BERT) model.

The methods may employ a language representation model referred to as Bidirectional Encoder Representations from Transformers (BERT). The BERT model was introduced in the paper "BERT: Pre-training of Deep Bidirectional Transformers for Language Understanding" by J. Devlin et al., that was published in 2019 Annual Conference of the North American Chapter of the Association for Computational Linguistics, the content of which is incorporated by reference herein. The BERT model is designed to pre-train deep bidirectional representations from unlabeled text by jointly conditioning on both left and right context in all layers. As a result, the pre-trained BERT model can be fine-tuned with just one additional output layer to create models for a wide range of tasks.

In some embodiments, determining a tag for at least one of the plurality of tokens comprises transforming, by a neural network encoder, the plurality of tokens into a plurality of numerical vectors in a latent space, and mapping, by a decoder, the plurality of numerical vectors into tags. The decoder may preferably comprise a dense neural network layer with a softmax activation function.

In order to determine one or more tags for a token, the plurality of tokens created by the preprocessing steps may be transformed into a plurality of numerical vectors in a latent space. A neural network encoder may be used to generate the results.

In a next step, a decoder may map the plurality of numerical vectors into tags. The decoder may comprise a dense neural network layer with a softmax activation function that maps the vector representations into tag decisions. The dense neural network layer of the decoder is a task-specific layer adaptable for each respective task. For example, the dense neural network layer may be adapted for the task of tagging financial documents with XBRL.

The plurality of numerical vectors includes a probability distribution over the possible tags. So if there are 1000 possible tags, the softmax function will return a 1000 dimension vector, where the $i^{th}$ value would be the probability that the token is to be tagged with the $i^{th}$ tag. The total sum of all probabilities normally adds up to 1.

In some embodiments, a collection of text documents is used to pre-train the deep learning module. The collection of text documents may consist of documents including financial information (i.e., financial documents). The collection of text documents used to pre-train the deep learning module may preferably include one or more numeric information or dates.

Many deep learning models (e.g., the BERT architecture) are pre-trained on a big corpus of English, generic-domain texts so they can handle generic-domain applications well enough. However, when dealing with tasks in specialized domains (e.g., finance, legal, medicine, etc.) such a generic training corpus normally does not produce optimal results.

Instead of using a generic training corpus, the method may therefore pre-train the deep learning module from scratch based on documents only from a specialized domain of interest. This improves the method's performance as peculiarities of the language used in the specialized domain are handled better. A domain specific collection of text documents may therefore be used for pre-training the deep learning module. For example, a collection of text documents including only financial documents is used to pre-train the BERT model included in the deep learning module to capture good representations of financial text in general. For pre-training the deep learning module, it is not necessary that the documents of the collection of text documents are labeled (i.e., include tags). The collection of text documents may thus comprise unlabeled documents or consist only of unlabeled documents. To further improve the performance, the collection of text documents for the pre-training may also be preprocessed to replace all, the majority (i.e., more than 70%), at least some (i.e., not more than 30%), two or more, or only a single number or date in the collection of text documents by a predetermined symbol (e.g., [NUM] or [SHAPE]) as described above for the tagging method or the training method. Experiments have shown that learning to handle numbers and/or dates during the model pre-training may be a better strategy than trying to acquire this knowledge only during fine-tuning.

For the financial domain, financial documents such as company filings (e.g., annual or quarterly business reports), financial analyst reports, receipts, invoices, tax documents, bank statements, balance sheets, profit or loss statements, or the like may be used to pre-train the deep learning module.

The financial documents may include structured and unstructured text that may indicate financial values and/or information. In one exemplary implementation, the collection of text documents used to pre-train the deep learning module may be based on annual and/or quarterly business reports downloaded from the United States Securities and Exchange Commission as described in more detail below.

In some embodiments, the plurality of electronic documents used as training dataset comprises labeled or tagged documents for training the deep learning module for the tagging task. The training dataset may comprise more than 1,000 electronic documents, preferably more than 10,000 electronic documents, and more preferably more than 100,000 electronic documents.

Documents included in the plurality of electronic documents used as training dataset (or the content of these documents) may be labeled with one or more tags. That means these documents already contain tags or annotations for certain pieces of information. For example, business reports include text passages with XBRL tags or different text passages, words, or numbers in the reports are labelled with one or more tags.

The plurality of electronic documents used as training dataset may be used to train the whole architecture of the deep learning module as described below in order to perform the tagging task.

In one example, the plurality of electronic documents used as training dataset may be based on (business) filings. The Electronic Data Gathering and Analysis Retrieval system (EDGAR) of the United States Securities and Exchange Commission (SEC) hosts different types of filings. For example, annual and quarterly reports of different companies can be accessed and downloaded. These reports are XBRL-tagged by company auditors and describe the performance and projections of the companies. In order to build the training dataset for the financial domain, annual and quarterly reports (i.e., business filings) of publicly traded companies may be downloaded from the respective website.

After downloading the reports, the reports may be pre-processed as described herein. The reports contain several items (i.e., sections). The Financial Statement Item in these reports is an important source for tagged text. On average, this section is 15 pages long and contains 27,000 words. The average number of XBRL tags is 47 and the tags are scattered through all the section. In one embodiment, only the text notes from the Financial Statement Item may be considered. The text notes may be split in a plurality of sentences.

The plurality of electronic documents used as training dataset may include a plurality of sentences with (gold) XBRL tags. Most tagged tokens are numeric, with the right tag depending mostly on the context, not the tokens themselves.

Additionally or alternatively, the plurality of electronic documents used as training dataset may comprise a collection of documents manually labelled by a user.

In some embodiments, the deep learning module is trained based on the plurality of electronic documents used as training dataset. The deep learning module receives a sequence of input tokens from the plurality of electronic documents used as training dataset. At least some of the tokens of the sequence of input tokens are associated with tags. The deep learning module is trained by: predicting, by the deep learning module, a tag for an input token of the sequence of input tokens; comparing the predicted tag (i.e., the output or the result of the prediction) with the tag associated with the input token (i.e., the training data); calculating, using a loss function (e.g. Cross Entropy), an error value for the predicted tag; and redefining and/or adjusting weights of a neural network of the deep learning module based on the error value of the loss function to produce better predictions in the future.

Once a neural network has been structured for a particular application, that network is ready to be trained. To start this process, initial weights may be chosen randomly. Then the training (learning) phase begins.

In the training phase, the correct tag (i.e., class) for each token is known (termed supervised training), and the output nodes can be assigned correct values, e.g. 1 for the node corresponding to the correct tag, and 0 for the others. It is thus possible to compare the network's calculated values for the output nodes to the correct tags, and calculate an error term for each node (the Delta rule). These error terms are then used to adjust the weights in the hidden layers so that, hopefully, during the next iteration the output values will be closer to the correct values.

In some of the embodiments, the determined tag is for the number or for the date in the electronic document to be tagged.

The method may determine tags for the numbers and/or the dates that were replaced by the predetermined symbol. The meaning of the number or the date mainly depends on the context in which it is used. The exact value is not so relevant. The method therefore may recommend tags for numbers or dates although they are replaced by the predetermined symbol during the preprocessing step.

In some of the embodiments, outputting the determined tag comprises displaying the electronic document to be tagged and the determined tag on a display.

For example, the method may display (the content of) the electronic document to be tagged or parts thereof on a display. In cases in which the electronic document to be tagged is a HTML file, the electronic document may, for example, be displayed using a web browser. Alternatively, an authoring system or tool may be used to display the electronic document.

In addition to displaying (the content of) the electronic document to be tagged, one or more annotations for the determined tag may be shown on the display. The annotations are associated with an element or a piece of information of the electronic document to be tagged. For example, an annotation will be associated with a word or a number in the electronic document to be tagged. The element of the electronic document to be tagged with which the annotation is associated is associated with or corresponds to the token for which the tag was determined.

For example, the tag or information associated with the tag may be displayed as tooltip. When hovering over a screen element or component associated with a token, a text box may display the tag, information about the tag, or information associated with the tag. The tooltip may be displayed continuously as long as a user hovers over the screen element.

Alternatively or additionally, screen elements belonging to tokens for which a tag was determined are marked or highlighted. For example, such screen elements may have a particular color, may be marked by a particular symbol, may be highlighted by a box or may be highlighted temporarily or permanently in any other manner.

In instances in which the method determines more than one tag for a particular element or piece of information in the electronic document to be tagged (e.g., the k most probable tags are determined), the method may recommend a user the more than one determined tag in a list and the user may select one or more tags of the more than one determined tag to be used for the tagging of the particular element or piece of information.

In some embodiments, outputting the determined tag may comprise storing the tag together with or separately from the electronic document to be tagged in a storage device.

In some alternative embodiments, the replacing step and the tokenizing step are performed by an adapted tokenizing step in a single step.

As described above, numbers and/or dates included in the extracted text are first replaced by a predetermined symbol and the text with the predetermined symbol(s) is then tokenized. By using the predetermined symbols, a standard tokenizing algorithm may be used without modifications.

In an alternative implementation, the used tokenizing algorithm for tokenizing the extracted text may be adapted so that each number and/or date included in the extracted text is transferred by the tokenization algorithm into a single token. The sub-word fragmentation of numbers and dates is thus avoided by modifying the used tokenization algorithm.

In some other alternative embodiments, instead of receiving the electronic document to be tagged or the plurality of electronic documents and then extracting text from the electronic document to be tagged or from the plurality of electronic documents, the input module receives text to be processed. In this alternative embodiment, no extraction of text is necessary.

The receipt of the electronic document(s) and the extraction of text is thus only performed if necessary and may be replaced or skipped if text is already received in an appropriate form (e.g., as an output from other processing modules or as result of a document generation process).

In further alternative embodiments, the extracting step, the replacing step, and/or the tokenizing step of the above-described tagging method and/or of the above-described training method do not need to be part of a preprocessing step or a preprocessing phase, but may be performed as separate steps.

In still further alternative embodiments, both for the above-described tagging method and for the above-described training method the tokenizing step is performed prior to the replacing step. As explained above, tokenizing numbers or dates in their original form may produce two or more tokens for a single number or a single date included in the extracted text. In order to avoid the above discussed fragmentation issues, the replacing step may combine all or at least some of the tokens belonging to a number or a date and may replace them with the predetermined symbol, preferably a single predetermined symbol, before determining a tag for the plurality of tokens or before training the deep learning module.

The described method is not domain-specific, but may be potentially applied to any domain where documents with numbers and/or dates need to be tagged. Some application domains are discussed below.

In some embodiments, the electronic document to be tagged is a document including financial information or the electronic document to be tagged is from a financial domain; and/or the determined tag is a tag from or the tags associated with text elements in the plurality of electronic documents are tags from the eXtensive Business Reporting Language, XBRL.

One application for which the described techniques may be used is for financial statements tagging. Financial documents such as annual or quarterly reports normally include many numbers and dates. Legislations around the world require such reports to be annotated with tags of XBRL. The described method may be used to tag annual or quarterly reports (or parts thereof) with XBRL tags.

The XBRL taxonomies have many different attributes. XBRL includes more than 6,008 tags. A subset of all possible tags may be used. For example, the 139 most frequently used tags may be selected for the automatic tagging process.

Additionally or alternatively, the method may be used to tag invoices.

The described method thus allows automatically tagging financial documents or at least proposing tags for certain pieces of information in financial documents with high accuracy.

In other embodiments, the described method is used to tag legal documents, medical documents or academic documents.

In the legal domain, it is necessary to analyze or tag contracts, agreements, or other legal documents. For example, lease contracts are first tagged by the described method. Tagged elements of the lease contracts are then extracted for further processing.

Further, documents in the medical or academic domain may be tagged by the described method. The tagged portions of the documents may then be extracted, analyzed and/or processed.

A data processing system or a data processing device comprising a processor and a memory is also provided. The processor is configured to perform the tagging method and/or the training method disclosed herein.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in real-time, offline, in a batch mode, etc. Portions of processing can be performed at different times and at different locations, by different (or the same) processing systems.

Those skilled in the relevant art will appreciate that the method may be implemented or practiced with different computer system configurations, including without limitation multi-processor systems, network devices, mini-computers, mainframe computers, data processors, and the like. The invention may be embodied in a computer or data processor that is specifically programmed, configured, or constructed to perform the functions described in detail herein. The invention may also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Various software/hardware/network architectures may be used. For example, the functions of the described method may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Further, a computer program product is provided. The computer program product comprises instructions which, when the program is executed by a computer or a computing device, cause the computer or the computing device to carry out the above described methods.

Any suitable programming language may be used to implement the routines, methods, or programs of embodiments of the invention described herein, including C, C++, Java, JavaScript, HyperText Markup Language (HTML), Python, or any other programming or scripting code.

Further, different programming techniques may be employed such as procedural or object oriented. Any particular routine may execute on a single computer processing device or multiple computer processing devices, a single computer processor or multiple computer processors.

A computer-readable medium comprising the computer program product is also provided. For example, the computer program product may be stored as computer instructions on a non-transitory computer-readable storage medium.

A "computer-readable medium" as used herein may be any medium that can contain, store, communicate, propagate, or transport the program for use by or in connection with an instruction execution system, apparatus, system, or device. The computer-readable medium may be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code).

Examples of non-transitory computer-readable media may include random access memories, read-only memories, hard drives, data cartridges, magnetic tapes, floppy diskettes, flash memory drives, optical data storage devices, compact-disc read-only memories, and other appropriate computer memories and data storage devices. Some or all of the software components may reside on a single computer or on any combination of separate computers.

The method discussed herein (or parts thereof) may be implemented in suitable instructions that may reside on the non-transitory computer-readable medium, hardware circuitry or the like, or any combination and that may be translatable by one or more machines.

BRIEF DESCRIPTION OF THE DRAWINGS

The forgoing and other features and advantages of the invention will become further apparent from the following detailed description read in conjunction with the accompanying drawings. In the drawings, like reference numbers refer to like elements.

FIG. 1 is a flowchart illustrating a method for tagging electronic documents according to an embodiment of the invention.

FIG. 2 is a flowchart illustrating preprocessing steps according to an embodiment of the invention.

DETAILED DESCRIPTION

Figure 3:
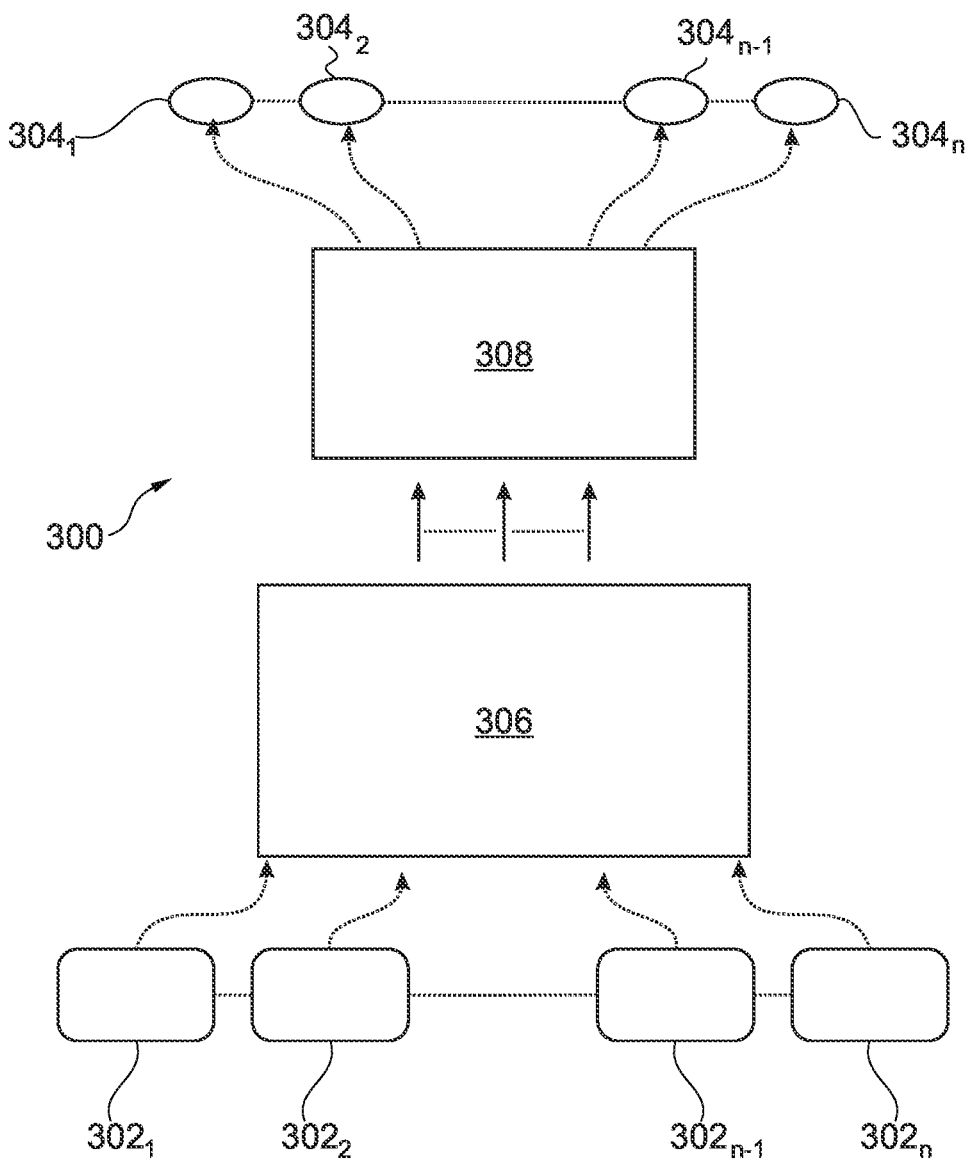
FIG. 3 is a schematic drawing illustrating a deep learning module according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

FIG. 1 shows a flowchart illustrating a method 100 for tagging electronic documents according to an embodiment of the invention.

At step 102, an input module receives a document that needs to be XBRL tagged. The document is a company filing. The input module receives the document as PDF file. Then, at step 104, the received document is preprocessed by a preprocessing module. The preprocessing module extracts text from the document, replaces numbers and dates in the extracted text with predetermined symbols, and then tokenizes the text with the predetermined symbols into text tokens.

At step 106, a deep learning module uses a neural network encoder in order to transform the text tokens into numerical vectors in a latent space. Based on the numerical vectors in the latent space tags are then determined by a decoder of the deep learning module. For example, method 100 predicts that the expression "30.2$" included in the received document should be labeled with XBRL tag "Revenue".

Recommendations of the deep learning module are displayed in step 108 on a user's display. Also at step 108, the user will be able to store the new, XBRL-tagged document in an electronic storage in order to proceed to submit the document to a local securities commission.

FIG. 2 shows a preprocessing process 200. Optional steps of the preprocessing process 200 are indicated by dashed boxes.

The preprocessing process 200 receives a document as input. At step 202, text is extracted from the document. At optional step 204, the preprocessing process 200 then detects and removes tables from the document if the tables do not need to be tagged. Then, at optional step 206, the preprocessing process 200 extracts specific sections of the document that a user is interested in tagging. The specific sections are split into sentences and the sentences are normalized at optional step 208. At step 210, numbers in the sentences are then replaced with predetermined symbols so that financial amounts in the sentences are represented by undividable expressions indicating the magnitude and/or shape of the numbers. This avoids "overfragmentation" by a classic tokenizer. The modified sentences are then tokenized into tokens at step 212. At optional step 214, unneeded content is filtered out by a heuristic classifier.

FIG. 3 is a schematic drawing illustrating a deep learning module 300 according to an embodiment of the invention.

The deep learning module 300 takes a sequence of N tokens $302_1$, $302_2$ ... $302_{n-1}$, $302_n$ and predicts N tags $304_1$, $304_2$, ..., $303_{n-1}$, $304_n$. The deep learning module 300 uses a neural network encoder 306 to encode the tokens $302_1$, $302_2$ ... $302_{n-1}$, $302_n$ into contextualized representations. The neural network encoder 306 is a specialized domain BERT model. In order for the deep learning module 300 to be able to produce the tags $304_1$, $304_2$ ... $303_{n-1}$, $304_n$, the deep learning module 300 employs a task-specific decoder 308 after the neural network encoder 306, which includes a dense neural network layer with a softmax activation function. The decoder 308 is used to finally map vector representations received from the neural network encoder 306 into the tags $304_1$, $304_2$, ..., $303_{n-1}$, $304_n$. The decoder's 308 number of units can be changed according to the task specification each time.

The output of the deep learning module 300 is heavily dependent on the proper tokenization of numeric expressions.

Figures 4A, 4B:
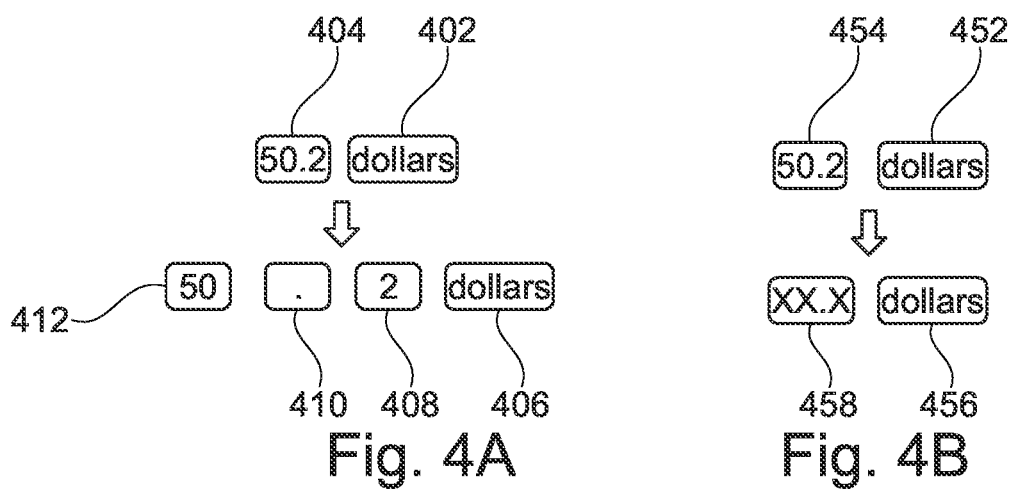
FIGS. 4A and 4B are schematic drawings illustrating two examples for tokenizing numeric expressions.

FIGS. 4A and 4B illustrate examples for tokenizing two numeric expressions.

One example for a tokenization algorithm is WordPiece. The WordPiece tokenization algorithm is a subword tokenization algorithm and is used, for example, for BERT, DistilBERT, and Electra. Given a text, the WordPiece tokenization algorithm produces tokens (i.e., subword units).

However, such a tokenization algorithm is not suitable for processing financial data (e.g., numerical expressions or date expressions) since it produces multiple, meaningless subword units when tokenizing. This happens because the tokenization algorithm splits tokens based on a vocabulary of commonly seen words. Since exact numbers (like 55,333.2) are not common, they are split into multiple, fragmented chunks. It is not possible to have an infinite vocabulary of all continuous numerical values. As it can be seen in FIG. 4A, input expression 402 for the word "dollars" produces output token 406. However, input expression 404 for the numerical value "50.2" produces three split output tokens 408, 410, and 412 associated with "50", ".", and "2". This fragmentation of numerical or date expressions has a negative impact on the performance of classifying tokens as tags.

In order to avoid this overfragmentation and to improve the performance, input tokens representing numerical values (e.g., financial amounts) or date values (e.g., deadlines) are pre-processed or special rules are applied so that such values are not split into multiple tokens.

For the tagging of documents, the exact value or the exact numbers of the numerical expressions and/or of the date expressions are not of particular relevance. The magnitude and/or the shape of the numerical values or of the date values are usually sufficient. As shown in FIG. 4B, input token 454 is normalized by its magnitude/shape and then transformed to output token 458 having the value "XX.X". Thus, a generalization of the numerical expression is used. This generalization improves the performance of the tagging task. Similar as in the example shown in FIG. 4A, input expression 452 for the word "dollars" still produces one output token 456 and does not differ from the example in FIG. 4A.

Figure 5A:
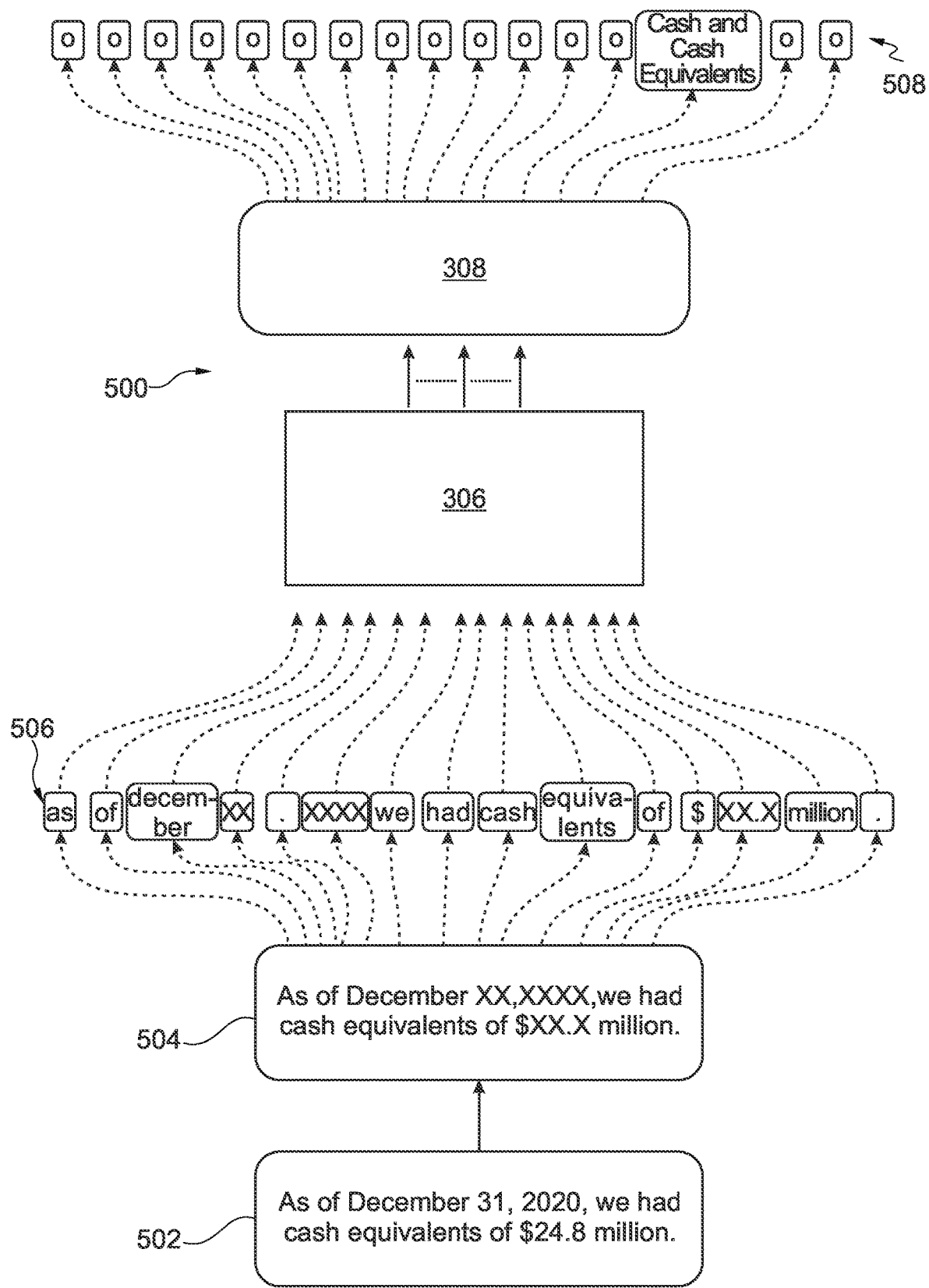
FIGS. 5A and 5B are schematic drawings illustrating tagging processes for two exemplary sentences.

FIG. 5A shows different phases of a tagging process 500 for a first exemplary sentence 502.

The tagging process 500 expects the first exemplary sentence 502 as input. Numbers and dates in the sentence 502 are replaced with special symbols to create a preprocessed sentence 504. In the embodiment shown in FIG. 5A, the numeric expression "24.8" is replaced with symbol "XX.X". Further, the numeric expressions "31" and "2020" in a date are replaced with symbol "XX" and "XXXX", respectively. The preprocessed sentence 504 then gets tokenized into a plurality of tokens 506. Due to the use of the symbol "XX.X", the number "24.8" is transformed into a single token. The numeric expressions in the date are transformed into tokens 506 representing the symbols "XX" and "XXXX". After that, the tokens 506 pass through the encoder 306 and the decoder 308 as described above. The tagging process 500 generates one class prediction 508 for each token 506. The "O" class is used to refer to tokens that represent no specific class. The numeric expression "24.8" is classified as "Cash and Cash Equivalents".

Figure 5B:
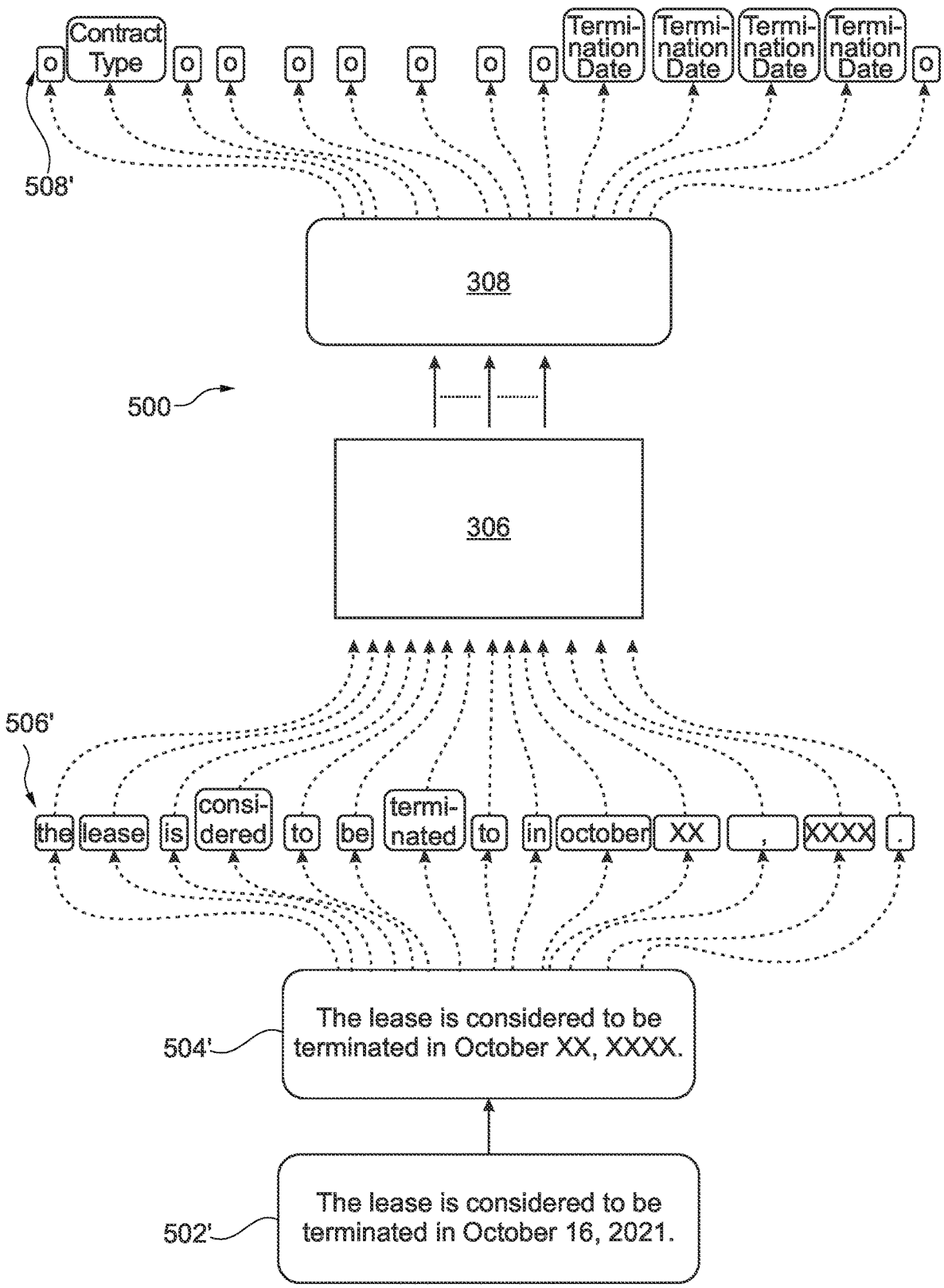

A tagging process 500' for a second exemplary sentence 502' is shown in FIG. 5B.

The tagging process 500' is similar to the tagging process 500 shown in FIG. 5A. The second exemplary sentence 502' is from the legal domain. The sentence 502' includes a date expression, namely "October 16, 2021". A modified sentence 504' is generated in which the date expression is normalized. The numeric expressions "16" and "2021" in the date are replaced with symbol "XX" and "XXXX", respectively. The modified sentence 504' is tokenized, by a classic tokenizer, into tokens 506'. The tagging process 500' then generates one class prediction 508' for each token 506'. The "O" class is again used to refer to tokens 506' that represent no specific class. As can be seen in FIG. 5B, the tagging process 500' classifies the token 506' for the word "lease" as "Contract Type". The tokens 506' for the expression "October 16, 2021" are all classified as "Termination Date".

Figure 6:
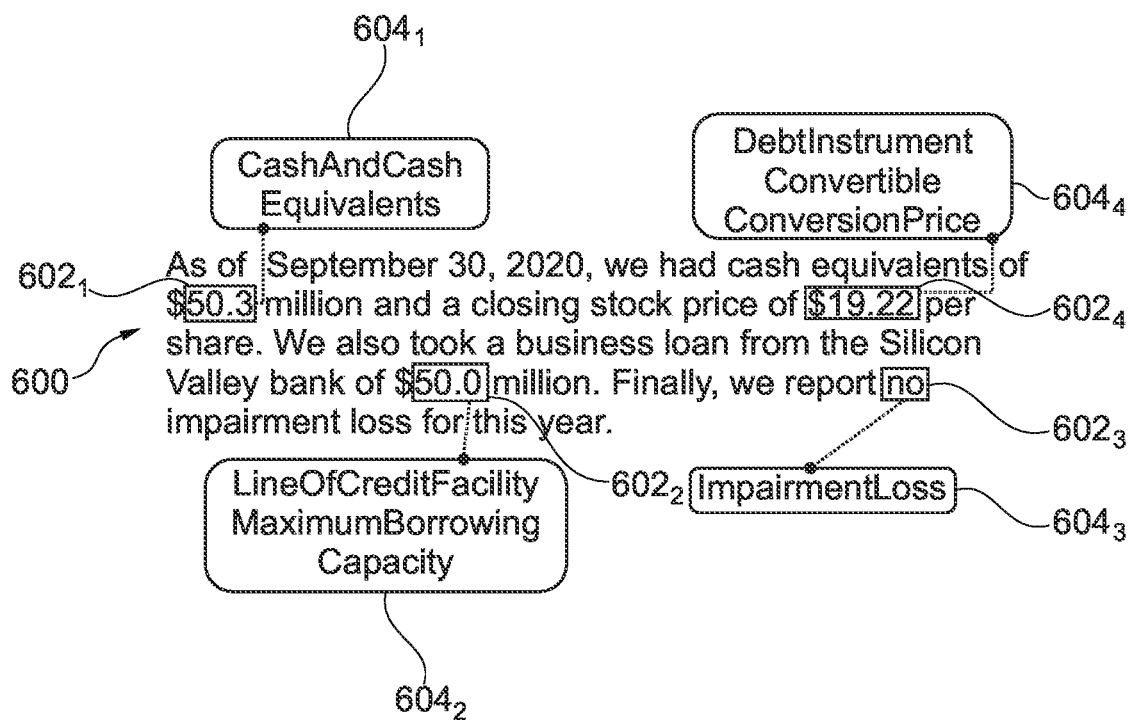
FIG. 6 is a schematic drawing illustrating an exemplary output of a tagging process according to an embodiment of the invention.

FIG. 6 shows an example for a possible output 600 of a tagging process.

Annotated tokens 602 are classified as specific XBRL tags 604 that represent financial attributes. The output 600 also illustrates how the XBRL tags 604 are heavily dependent on the context of sequences. For example, while tokens $602_2$ and $602_3$ for "50.0" and "50.3" are similar text-wise, they are associated with XBRL tag $604_2$ and XBRL tag $604_3$ which are different due to the context in which the tokens $602_2$ and $602_3$ are used.

Figure 7:
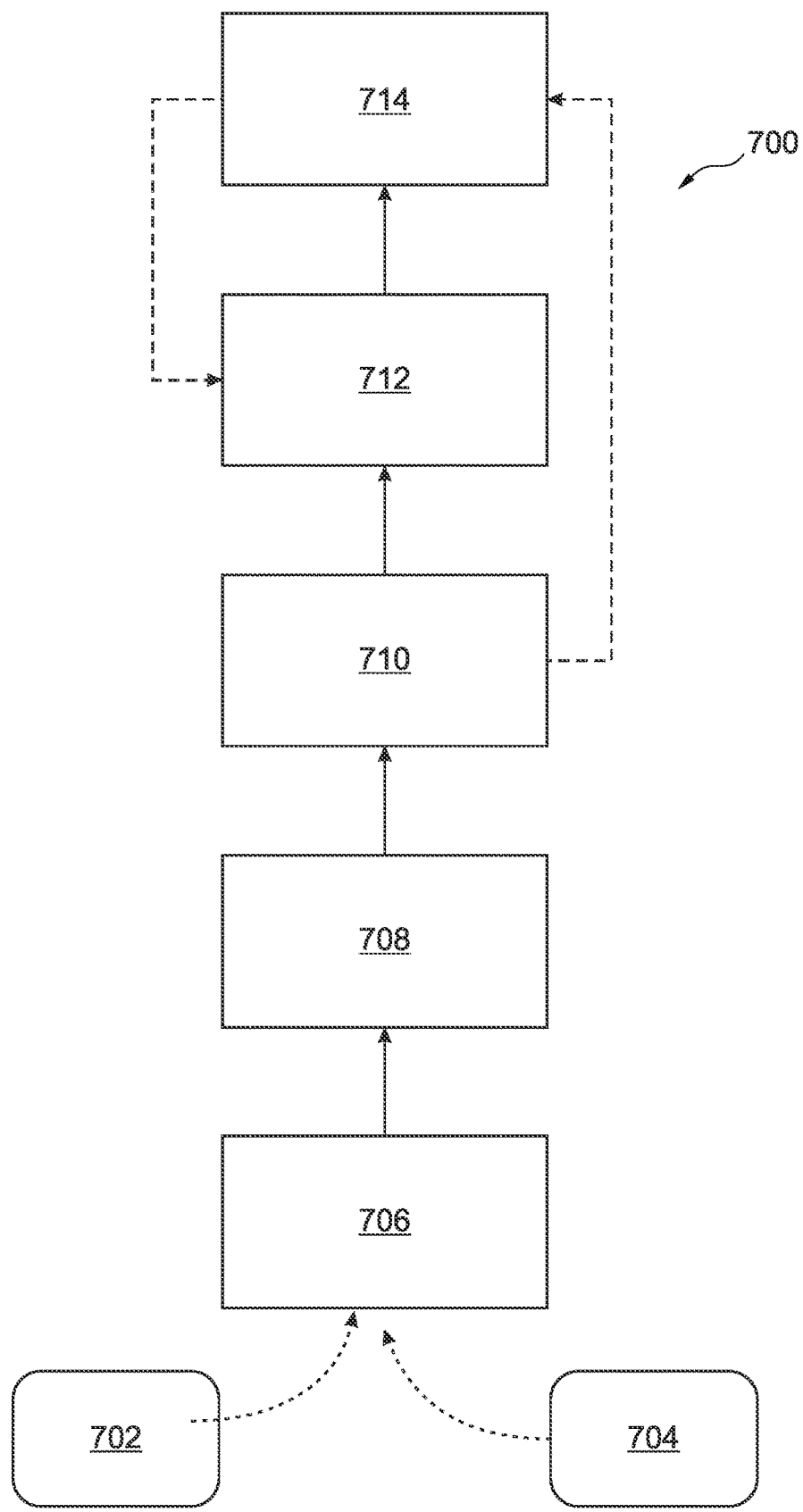
FIG. 7 is a flowchart illustrating a method for training a deep learning module according to an embodiment of the invention.

FIG. 7 shows a flowchart illustrating a method 700 for training a deep learning module.

At step 706, the method 700 receives documents that already contain XBRL tags. Initially, the method 700 gets trained on a large first collection of labeled documents 702. The method 700 may later get updated via a second collection of labeled documents 704. At step 708, the labeled documents 702, 704 are preprocessed by a preprocessing module to generate tokens along with their labels. At step 710, the tokens and the labels are then used to train the deep learning module. In each epoch, the deep learning module tries at step 712 to predict N correct tags for a sequence of N tokens. At step 714, the deep learning module then compares its predictions (i.e., outputs) with the correct labels included in the labeled documents 702, 704 and calculates a loss function (e.g., Cross Entropy). Then, an optimizer (e.g., Adam) redefines the weights of a neural network inside the deep learning module in order to adjust and produce better predictions in the future.

Figure 8:
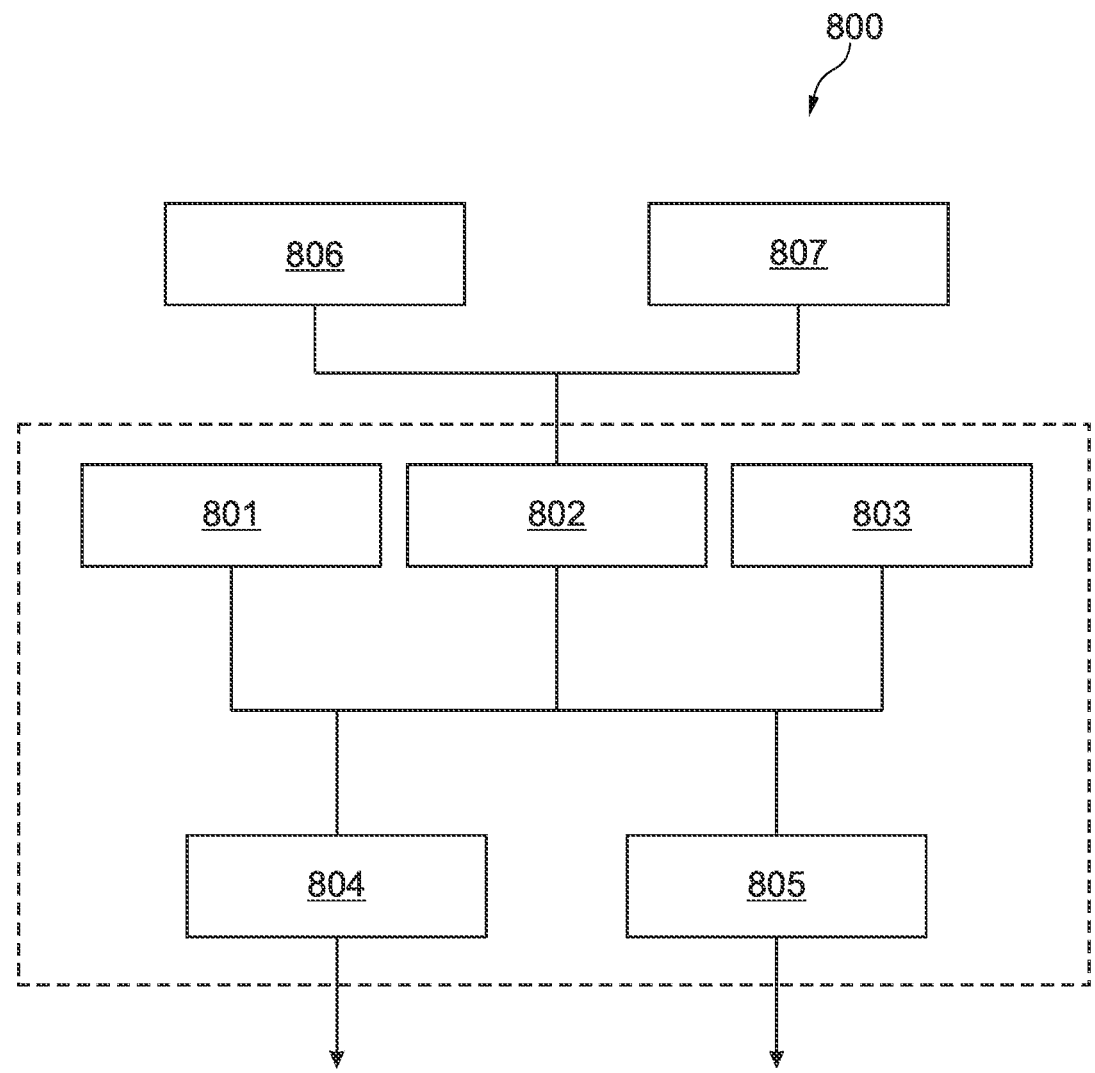
FIG. 8 is a diagrammatic representation of a data processing system for performing the methods disclosed herein.

FIG. 8 depicts a diagrammatic representation of a data processing system 800 for implementing a method for tagging electronic documents and/or for training a deep learning module as described herein.

As shown in FIG. 8, the data processing system 800 includes one or more central processing units (CPU) or processors 801 coupled to one or more user input/output (I/O) devices 802 and memory devices 803. Examples of I/O devices 802 may include, but are not limited to, keyboards, displays, monitors, touch screens, printers, electronic pointing devices such as mice, trackballs, styluses, touch pads, or the like. Examples of memory devices 803 may include, but are not limited to, hard drives (HDs), magnetic disk drives, optical disk drives, magnetic cassettes, tape drives, flash memory cards, random access memories (RAMs), read-only memories (ROMs), smart cards, etc. The data processing system 800 is coupled to a display 806, an information device 807 and various peripheral devices (not shown), such as printers, plotters, speakers, etc. through the I/O devices 802. The data processing system 800 is also coupled to external computers or other devices through a network interface 804, a wireless transceiver 805, or other means that is coupled to a network such as a local area network (LAN), wide area network (WAN), or the Internet.

It will also be appreciated that one or more of the elements depicted in the drawings/figures can also be implemented in a more separated or integrated manner, or even removed or rendered as inoperable in certain cases, as is useful in accordance with a particular application.

As used herein, the terms "comprises", "comprising", "includes", "including", "has", "having", or any other variation thereof, are intended to cover a non-exclusive inclusion. For example, a method, process, product, article, or apparatus that comprises a list of elements is not necessarily limited only to those elements but may include other elements not expressly listed or inherent to such method, process, product, article, or apparatus.

Furthermore, the term "or" as used herein is generally intended to mean "and/or" unless otherwise indicated. For example, a condition A or B (as well as a condition A and/or B) is satisfied by any one of the following: A is true (or present) and B is false (or not present), A is false (or not present) and B is true (or present), and both A and B are true (or present).

As used herein, including the claims that follow, a term preceded by "a" or "an" (and "the" or "said" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

While specific embodiments are disclosed herein, various changes and modifications can be made without departing from the scope of the invention. For example, one or more steps may be performed in other than the recited order, and none or more depicted steps may be optional in accordance with aspects of the disclosure. The present embodiments are to be considered in all respects as illustrative and non-restrictive, and all changes coming within the meaning and equivalency range of the appended claims are intended to be embraced therein.

The invention claimed is:

1. A computer-implemented method for tagging electronic documents, the computer-implemented method comprising:
   receiving, by an input module, an electronic document to be tagged;
   preprocessing, by a preprocessing module, the electronic document to be tagged, the preprocessing comprising:
      extracting a text from the electronic document to be tagged;
      replacing at least one of a numerical amount or a date in the extracted text with a predetermined symbol, wherein the predetermined symbol is not used in the extracted text before replacing at least one of the numerical amount or the date in the extracted text, wherein the predetermined symbol includes a special character that is non-numeric and non-alphabetic; and
      tokenizing the extracted text with the predetermined symbol into a plurality of tokens without fragmenting the predetermined symbol, wherein keeping the predetermined symbol unfragmented avoids inaccurate tagging associated with the predetermined symbol;
   determining, by a deep learning module, a tag for at least one of the plurality of tokens; and
   outputting, by an output module, the determined tag for the at least one of the plurality of tokens.

2. The computer-implemented method of claim 1, wherein tokenizing the extracted text into the plurality of tokens transfers the predetermined symbol into a single token.

3. The computer-implemented method of claim 1, wherein the extracted text includes at least one additional element to be replaced, wherein the at least one additional element includes at least one of an additional numerical amount or an additional date, and wherein the preprocessing comprises replacing the at least one additional element with the predetermined symbol.

4. The computer-implemented method of claim 1, wherein the predetermined symbol represents a characteristic of the numerical amount or of the date, wherein the characteristic includes at least one of a shape, a format or a magnitude.

5. The computer-implemented method of claim 1, wherein the deep learning module comprises an artificial neural network.

6. The computer-implemented method of claim 1, wherein the deep learning module comprises a transformer-based deep learning model, and wherein the transformer-based deep learning model is based on a Bidirectional Encoder Representations from Transformers (BERT) model.

7. The computer-implemented method of claim 1, wherein determining a tag for at least one of the plurality of tokens comprises:
   transforming, by a neural network encoder, the plurality of tokens into a plurality of numerical vectors in a latent space; and
   mapping, by a decoder, the plurality of numerical vectors into tags, the decoder comprising a dense neural network layer with a softmax activation function.

8. The computer-implemented method of claim 1, wherein the tag is for a token representing the predetermined symbol associated with the numerical amount or the date in the electronic document to be tagged.

9. The computer-implemented method of claim 1, wherein the electronic document to be tagged is at least one of a document including financial information or a document from a financial domain; and wherein the tag is associated with an eXtensive Business Reporting Language (XBRL).

10. The computer-implemented method of claim 1, wherein the deep learning module is trained for determining the tag by:
   receiving, by the input module, a plurality of electronic documents as a training dataset, the plurality of electronic documents comprising tags associated with text elements in the plurality of electronic documents;

preprocessing, by the preprocessing module, the plurality of electronic documents, wherein each of the plurality of electronic documents is preprocessed by:
    extracting a corresponding text from each of the plurality of electronic documents;
    replacing an element in the extracted corresponding text with the predetermined symbol; and
    tokenizing the extracted corresponding text with the predetermined symbol into a second plurality of tokens, wherein at least some of the second plurality of tokens are associated with one or more tags; and
training, by a training module, the deep learning module with the second plurality of tokens along with the one or more tags.

11. A computer-implemented method for training a deep learning module, the computer-implemented method comprising:
    receiving, by an input module, a plurality of electronic documents as training dataset, the plurality of electronic documents comprising tags associated with text elements in the plurality of electronic documents;
    preprocessing, by a preprocessing module, the plurality of electronic documents, wherein each of the plurality of electronic documents is preprocessed by:
        extracting a text from each of the plurality of electronic documents;
        replacing at least one of a numerical amount or a date in the extracted text with a predetermined symbol, wherein the predetermined symbol is not used in the extracted text before replacing at least one of the numerical amount or the date in the extracted text, wherein the predetermined symbol includes a special character that is non-numeric and non-alphabetic; and
        tokenizing the extracted text with the predetermined symbol into a plurality of tokens without fragmenting the predetermined symbol, wherein at least some of the plurality of tokens are associated with the tags, and wherein keeping the predetermined symbol unfragmented avoids inaccurate tagging associated with the predetermined symbol; and
    training, by the training module, the deep learning module with the plurality of tokens along with the tags.

12. The computer-implemented method of claim 11, wherein tokenizing the extracted text into the plurality of tokens transfers the predetermined symbol into a single token.

13. The computer-implemented method of claim 11, wherein the extracted text includes at least one additional element to be replaced, wherein the at least one additional element includes at least one of an additional numerical amount or an additional date, and wherein the preprocessing comprises replacing the at least one additional element with the predetermined symbol.

14. The computer-implemented method of claim 11, wherein the predetermined symbol represents a characteristic of the numerical amount or of the date, wherein the characteristic includes at least one of a shape, a format or a magnitude.

15. The computer-implemented method of claim 11, wherein the deep learning module comprises an artificial neural network.

16. The computer-implemented method of claim 11, wherein the deep learning module comprises a transformer-based deep learning model, and wherein the transformer-based deep learning model is based on a Bidirectional Encoder Representations from Transformers (BERT) model.

17. The computer-implemented method of claim 11, wherein the plurality of electronic documents includes at least one of a document including financial information or a document from a financial domain; and wherein the tags associated with text elements in the plurality of electronic documents are tags associated with an eXtensive Business Reporting Language (XBRL).

18. A data processing apparatus, comprising:
at least one processor; and
memory storing computer-readable instructions that, when executed by the at least one processor, cause the data processing apparatus to:
    receive, by an input module of the data processing apparatus, an electronic document to be tagged;
    preprocess, by a preprocessing module of the data processing apparatus, the electronic document to be tagged, the preprocessing comprising:
        extracting a text from the electronic document to be tagged;
        replacing at least one of a numerical amount or a date in the extracted text with a predetermined symbol, wherein the predetermined symbol is not used in the extracted text before replacing at least one of the numerical amount or the date in the extracted text, wherein the predetermined symbol includes a special character that is non-numeric and non-alphabetic; and
        tokenizing the extracted text with the predetermined symbol into a plurality of tokens without fragmenting the predetermined symbol, wherein keeping the predetermined symbol unfragmented avoids inaccurate tagging associated with the predetermined symbol;
    determine, by a deep learning module of the data processing apparatus, a tag for at least one of the plurality of tokens; and
    output, by an output module of the data processing apparatus, the determined tag for the at least one of the plurality of tokens.

\* \* \* \* \*